United States Patent
Luo et al.

(10) Patent No.: US 9,684,498 B2
(45) Date of Patent: Jun. 20, 2017

(54) FILE PROCESSING METHOD AND ELECTRONIC APPARATUS

(71) Applicant: MediaTek Singapore Pte. Ltd., Singapore (SG)

(72) Inventors: Shiqi Luo, Chengdu (CN); Hongwei Wang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/660,943

(22) Filed: Mar. 18, 2015

(65) Prior Publication Data

US 2015/0268943 A1    Sep. 24, 2015

(30) Foreign Application Priority Data

Mar. 19, 2014    (CN) .......................... 2014 1 0101744

(51) Int. Cl.
*G06F 9/445*    (2006.01)
*G06F 9/44*    (2006.01)

(52) U.S. Cl.
CPC .............. *G06F 8/60* (2013.01); *G06F 9/4448* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 5,903,859 A * | 5/1999 | Stone | ................. | G06F 9/4448 704/8 |
| 5,917,484 A * | 6/1999 | Mullaney | ................. | G06F 17/27 704/8 |
| 6,618,771 B1 * | 9/2003 | Leja | ................. | G06F 9/4411 710/10 |
| 6,859,820 B1 * | 2/2005 | Hauduc | ................. | G06F 9/4448 704/2 |
| 8,041,346 B2 * | 10/2011 | Tyhurst | ................. | H04L 67/34 370/313 |
| 2002/0054097 A1 * | 5/2002 | Hetherington | ........ | G06F 9/4448 715/762 |
| 2005/0060378 A1 * | 3/2005 | Girard | ................. | G06F 17/289 709/206 |

(Continued)

FOREIGN PATENT DOCUMENTS

| | | | |
|---|---|---|---|
| CN | 103019736 A | * | 4/2013 |
| CN | 103425509 A | | 12/2013 |
| CN | 104123150 A | * | 10/2014 |

OTHER PUBLICATIONS

NPL-MSDN—Multiple Language Merger Methods—2012, located at https://msdn.microsoft.com/en-us/library/windows/desktop/aa370525(v=vs.85).aspx, 2012.*

*Primary Examiner* — Wei Zhen
*Assistant Examiner* — Hossain Morshed
(74) *Attorney, Agent, or Firm* — Winston Hsu

(57) ABSTRACT

A file processing method applied to an operating system, includes: packaging a first package file which supports a plurality of language versions into a plurality of first single-language package files, wherein the plurality of first single-language package files correspond to the plurality of language versions, respectively; and adding the plurality of first single-language package files to a plurality of language packages, respectively.

14 Claims, 6 Drawing Sheets

(56) References Cited

U.S. PATENT DOCUMENTS

| | | | |
|---|---|---|---|
| 2006/0242621 A1* | 10/2006 | Ye | G06F 9/4448 717/105 |
| 2007/0073530 A1* | 3/2007 | Iso-Sipila | G06F 9/4448 704/3 |
| 2007/0255554 A1* | 11/2007 | Cai | G06F 17/289 704/9 |
| 2011/0214118 A1* | 9/2011 | Antill | G06F 9/4448 717/174 |
| 2013/0201980 A1* | 8/2013 | Rahul | H04W 88/08 370/338 |
| 2015/0062605 A1* | 3/2015 | McKinney | H04N 1/00498 358/1.13 |

\* cited by examiner

FILE PROCESSING METHOD AND ELECTRONIC APPARATUS

BACKGROUND

The disclosed embodiments of the present invention relate to a file processing method applied to an operating system, and more particularly, to a file processing method and related electronic apparatus using the operating system (such as an Android system) capable of loading a language which a system file (such as system.img) does not support.

In the Android system, all support file types are recorded in a system file (such as system.img) in a framework layer, and language kinds are also recorded in the system file. When a user wants to change language or switch language display of a certain application, an asset manager only can select from languages supported by the system file. If the system file does not support the language which the user wants to use, the user has to use a brush machine method for the system, that is, re-install the whole system to add system languages. However, the brush machine method has a lengthy and cumbersome process, and has some kind of risk (improper brush machine may cause unnecessary troubles possibly). Moreover, the user has to backup data in advance, and it bothers the user very much. Thus, an innovative file processing method is required to solve the language setting problem for the Android system.

SUMMARY

The present invention provides a file processing method applied to an operating system and related electronic apparatus using the operating system to solve the above-mentioned problem.

According to a first aspect of the present invention, a file processing method applied to an operating system is disclosed. The file processing method comprises: packaging a first package file which supports a plurality of language versions into a plurality of first single-language package files, wherein the plurality of first single-language package files correspond to the plurality of language versions, respectively; and adding the plurality of first single-language package files to a plurality of language packages, respectively.

According to a second aspect of the present invention, an electronic apparatus using an operating system is disclosed. The electronic apparatus comprises: a compiling module, for packaging a first package file which supports a plurality of language versions into a plurality of first single-language package files, wherein the plurality of first single-language package files correspond to the plurality of language versions, respectively; and a package management system, for adding the plurality of first single-language package files to a plurality of language packages, respectively.

Briefly summarized, by using the file processing method and the electronic apparatus performing the method of the present invention, when a language (such as German) which the system does not have is required to be added, as long as install the German language package (de.apk), the PMS can identify the German language package from the language package set outside the system file, and add it to the resource candidate list. In this way, the present invention can add new system languages to the Android system fast and flexibly without using the brush machine method.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
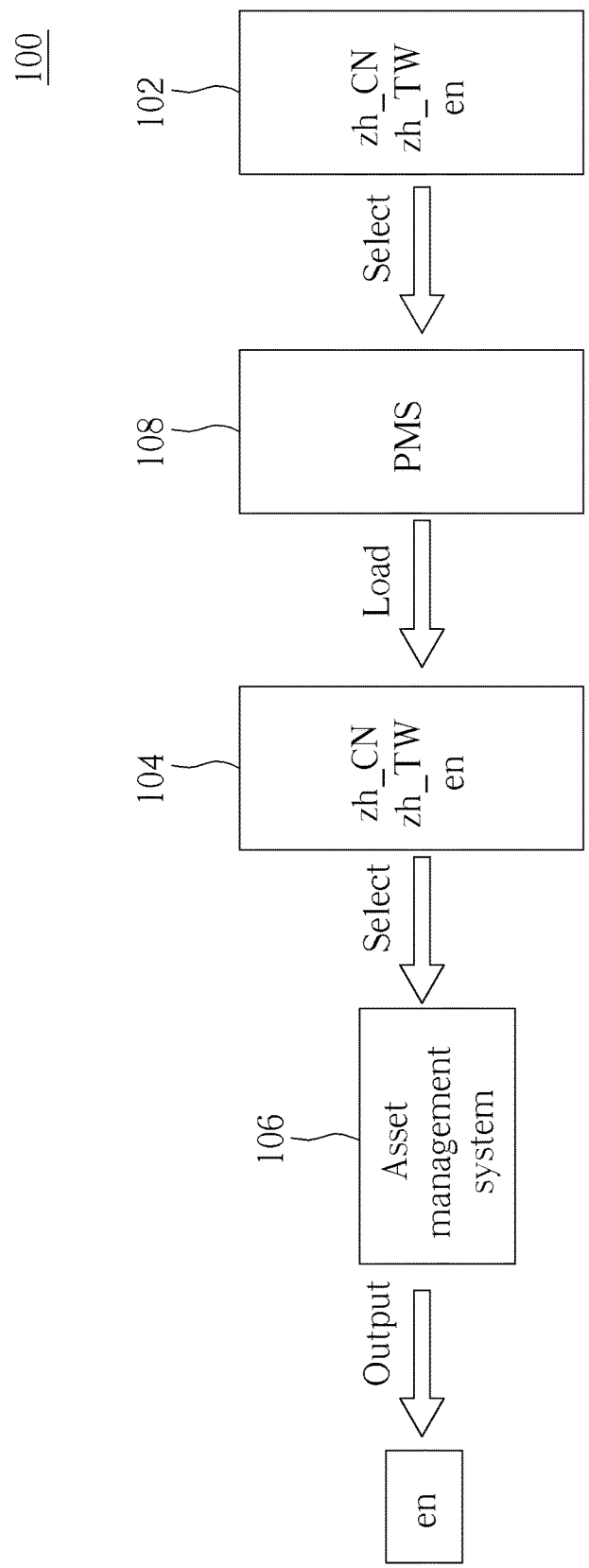
FIG. 1 is a simplified diagram of a conventional electronic apparatus which can switch language display in an operating system (such as the Android system).

Please refer to FIG. 1. FIG. 1 is a simplified diagram of a conventional electronic apparatus 100 which can switch language display in an operating system (such as the Android system). For example, a system file (system.img) 102 in a framework layer comprises three system language packages having been installed for selection: a simplified Chinese (language code: zh_CN) system language package, a traditional Chinese (language code: zh_TW) system language package, and an English (language code: en) system language package. If a user wants to switch the language display from simplified Chinese to English, the English system language package will be found by a package management system (PMS) 108 from the system file 102, and loaded to a resource candidate list 104. Next, an asset management system 106 will obtain the English system language package from the resource candidate list 104 and output it.

Figure 2:
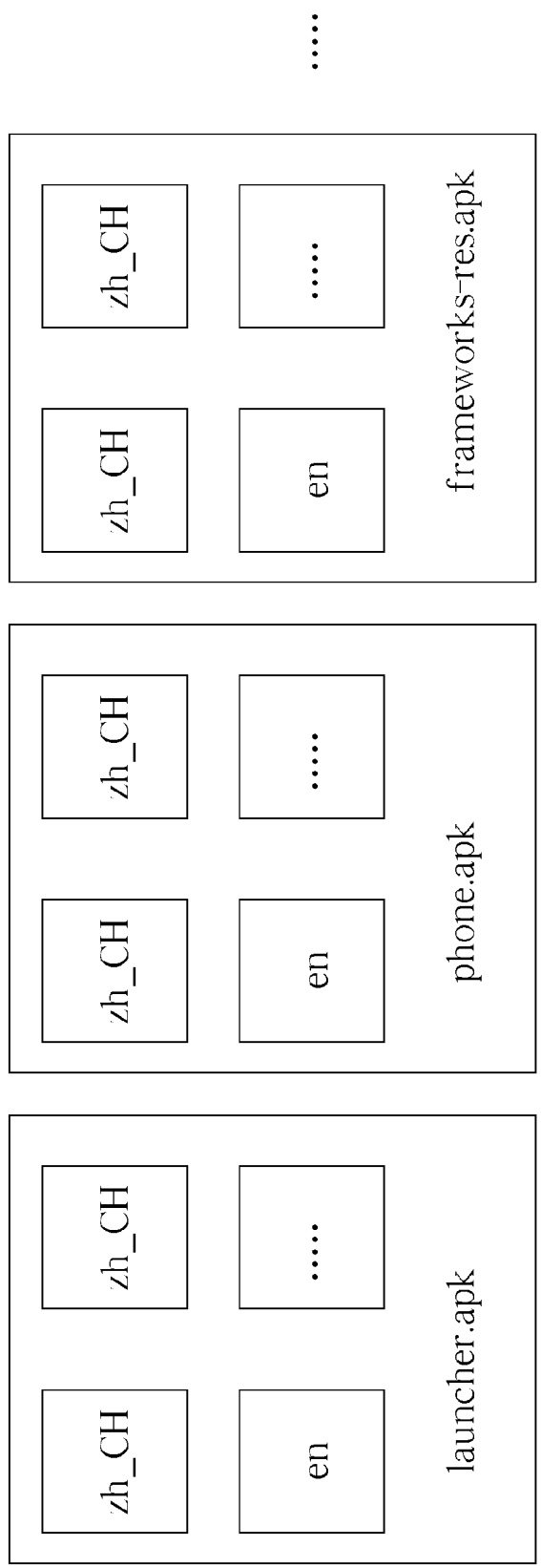
FIG. 2 is a simplified diagram of application package files and framework package files of a conventional Android system.

Please refer to FIG. 2. FIG. 2 is a simplified diagram of application package files and framework package files of a conventional Android system. For example, the Android system comprises: a launcher package file (such as launcher.apk), a phone package file (such as phone.apk), and a framework package file (such as frameworks-res.apk), etc. Each package file comprises different language versions, such as simplified Chinese (language code: zh_CN), traditional Chinese (language code: zh_TW), and English (language code: en), etc. Since strings of the different languages are disposed inside each application package file or framework package file, it must use a brush machine method to add a non-default language to be a new system language. In order to solve the problem of using the brush machine method to add a new system language and increase flexibility of language setting in the operating system (such as the Android system), the present invention provides a file processing method applied to an operating system, which can load and use a new system language without using the brush machine method. Further details are described as below.

Figure 3:
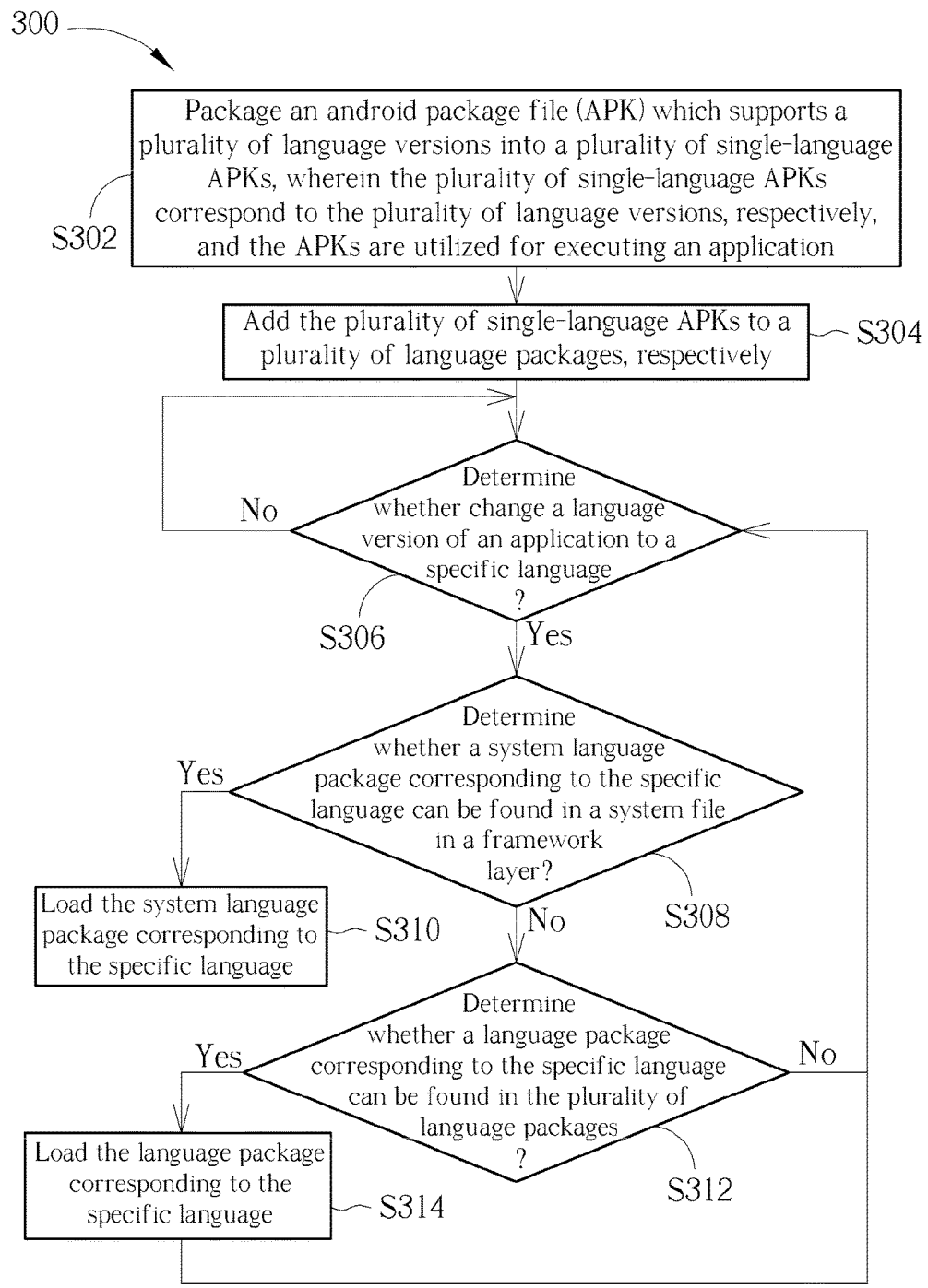
FIG. 3 is a flowchart showing a file processing method applied to an operating system in accordance with an exemplary embodiment of the present invention.

Please refer to FIG. 3. FIG. 3 is a flowchart showing a file processing method applied to an operating system in accordance with an exemplary embodiment of the present invention. Please note that the Android system is used as an example to illustrate features of the present invention, and the Android system is not meant to be a limitation of the present invention. In other words, any operating system using the file processing method disclosed by the present invention would fall within the scope of the present invention. Provided that the result is substantially the same, the steps are not required to be executed in the exact order of flowchart 300 shown in FIG. 3. Moreover, some steps in FIG. 3 can be omitted according to different embodiments or design requirements. The file processing method disclosed by the present invention comprises the following steps:

Step S302: Package an android package file (APK) which supports a plurality of language versions into a plurality of single-language APKs, wherein the plurality of single-language APKs correspond to the plurality of language versions, respectively, and the APKs are utilized for executing an application.

Step S304: Add the plurality of single-language APKs to a plurality of language packages, respectively.

Step S306: Determine whether change a language version of an application to a specific language? If yes, then go to Step S308; if no, then continue to perform Step S306.

Step S308: Determine whether a system language package corresponding to the specific language can be found in a system file in a framework layer? If yes, then go to Step S310; if no, then go to Step S312.

Step S310: Load the system language package corresponding to the specific language.

Step S312: Determine whether a language package corresponding to the specific language can be found in the plurality of language packages? If yes, then go to Step S314; if no, then go back to Step S306.

Step S314: Load the language package corresponding to the specific language.

Figure 4:
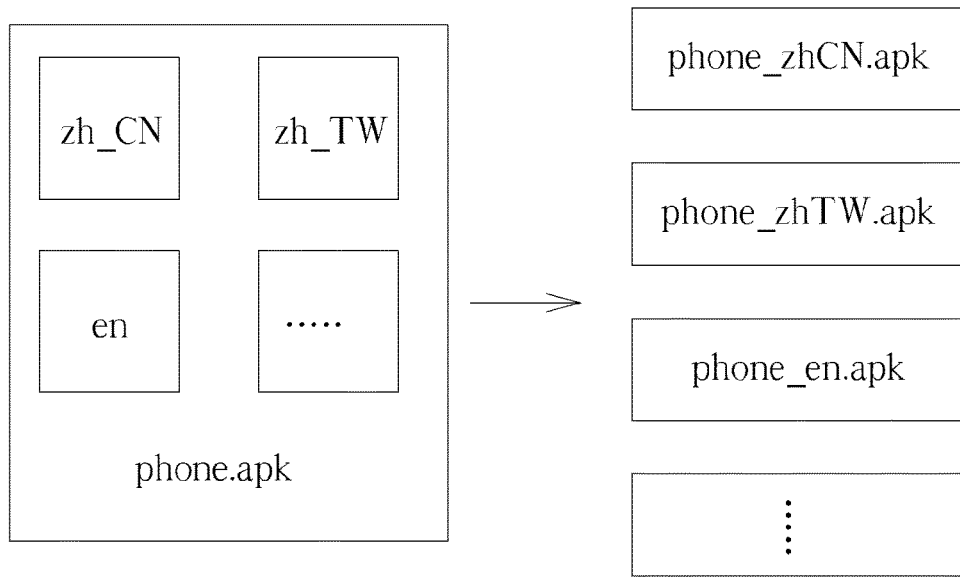
FIG. 4 is a simplified diagram of a language packaging method of an application package file of the present invention.

Firstly, in the Step S302, an APK which supports a plurality of language versions will be packaged into a plurality of single-language APKs by language kind. In an embodiment, names of the plurality of single-language package files are a name of the package file adding with language codes corresponding to the plurality of language versions. For example, please refer to FIG. 4. FIG. 4 is a simplified diagram of a language packaging method of an application package file of the present invention. For example, the phone package file (phone.apk) comprises simplified Chinese (language code: zh_CN), traditional Chinese (language code: zh_TW), and English (language code: en), etc. Thus, the phone package file will be packaged into a plurality of small language packages and named in a specific way. In this embodiment, the small language packages are named as "original package file name" with "_" and "language code". For example, simplified Chinese language package is named as phone_zhCN.apk, traditional Chinese language package is named as phone_zhTW.apk, and English language package is named as phone_en.apk.

Figure 5:
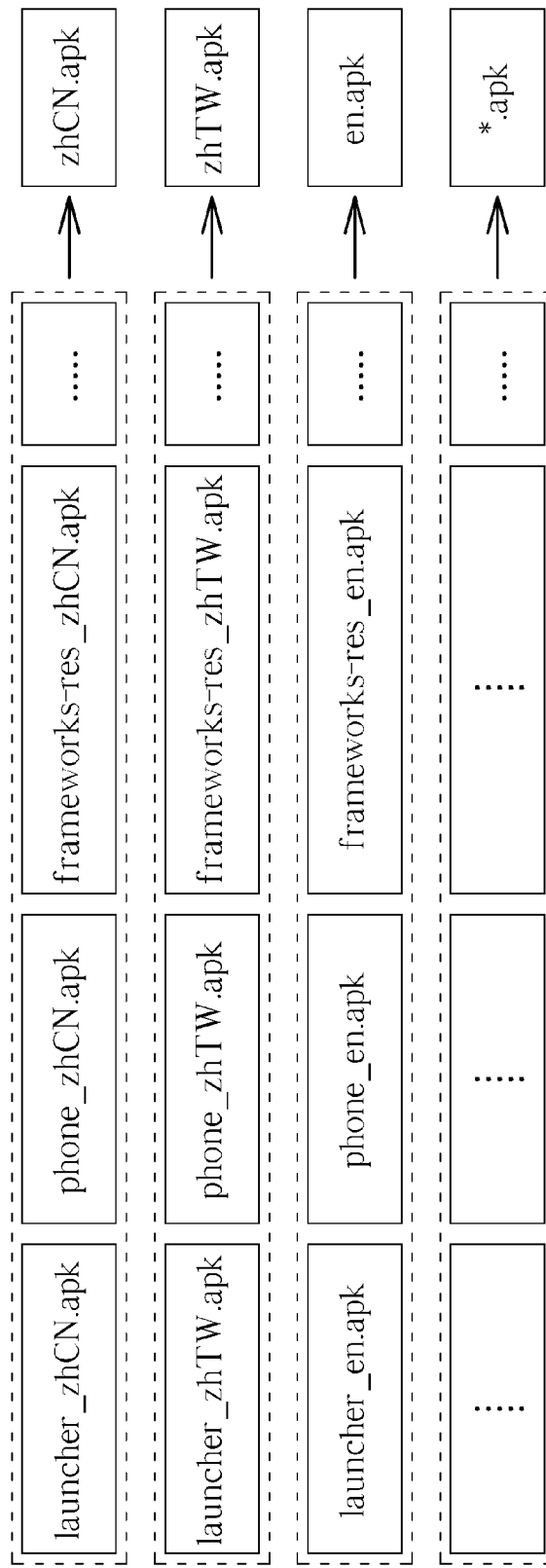
FIG. 5 is another simplified diagram of the language packaging method of the application package file of the present invention.

Please refer to FIG. 5. FIG. 5 is another simplified diagram of the language packaging method of the application package file of the present invention. After the launcher package file, the phone package file, and the framework package file are respectively packaged into the small language packages in the Step S302, the small language packages of the same language will be combined to be a new language package (Step S304), such as simplified Chinese language package zhCN.apk (combined by simplified Chinese language packages of the different package files), traditional Chinese language package phone_zhTW.apk (combined by traditional Chinese language packages of the different package files), and English language package phone_en.apk (combined by English language packages of the different package files). Please note that language kinds of the newly combined language package mentioned above can be the original languages supported by the system, or newly added additional new language kinds. For example, if the Android system only supports simplified Chinese, traditional Chinese, and English originally, using the above method can add an Argentinian language package ar.apk, a German language package de.apk, and an Australian language package au.apk without using the brush machine method.

Figure 6:
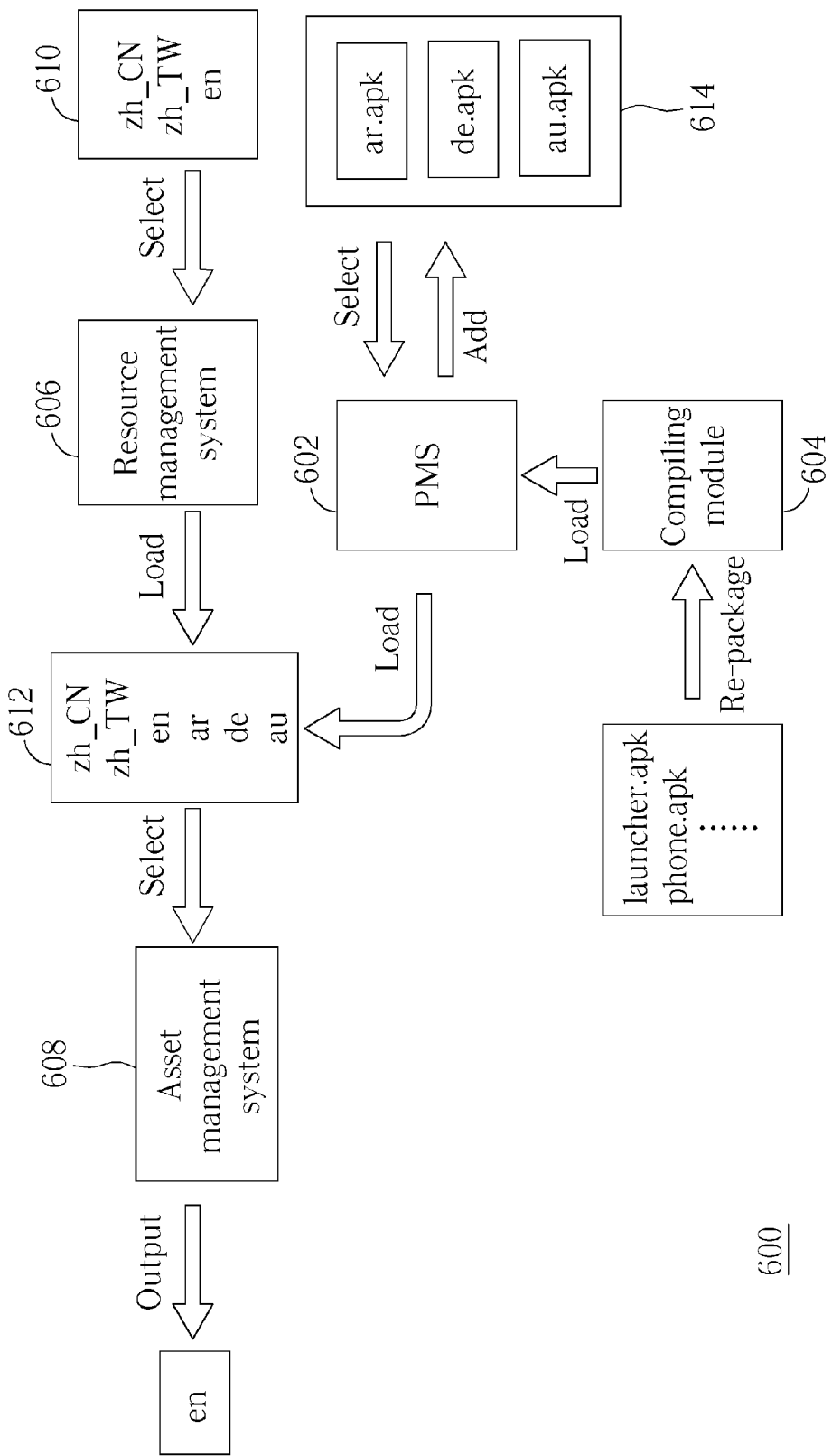
FIG. 6 is a simplified diagram of an electronic apparatus which can switch language display in an operating system in accordance with an exemplary embodiment of the present invention.

Next, please refer to FIG. 6. FIG. 6 is a simplified diagram of an electronic apparatus 600 which can switch language display in an operating system in accordance with an exemplary embodiment of the present invention. The electronic apparatus 600 comprises: a package management system (PMS) 602, a compiling module 604, a resource management system 606, an asset management system 608, a system file 610, a candidate source list 612, a language package set 614. For example, the system file 610 can be in a framework layer of the electronic apparatus 600, and the system file 610 comprises three system language packages having been installed for selection: a simplified Chinese (language code: zh_CN) system language package, a traditional Chinese (language code: zh_TW) system language package, and an English (language code: en) system language package. Besides, an Argentinian language package ar.apk (language code: ar), a German language package de.apk (language code: de), and an Australian language package au.apk (language code: au) are combined in the language package set 614. If a user wants to switch the language display from simplified Chinese to English (the Step S306), resource management system 606 will search the English system language package from the system file 610 (the Step S308) and load it to the resource candidate list 612 (the Step S310). Next, the asset management system 608 will obtain the English system language package from the resource candidate list 612 and output it. If a user wants to switch the language display from simplified Chinese to German, although the system language package file corresponding to German can not be found in the system file 610 (the Step S308), the PMS 602 can identify the German language package from the language package set 614 (the Step S312), and load the German language package to the resource candidate list 612 (the Step S314). Next, the asset management system 608 will obtain the German language package from the resource candidate list 612 and output it. The above German language package in the resource candidate list 612 can be obtained by the following method: as shown in FIG. 4 and FIG. 5, the compiling module 604 packages the APK which supports a plurality of language versions into a plurality of single-language APK by language kind, and the PMS 602 add the plurality of single-language APKs to a plurality of language packages, respectively, wherein the plurality of language packages can be in the language package set 614. The PMS 602 can identify the German language package from the language package set 614.

Briefly summarized, by using the file processing method and the electronic apparatus performing the method of the present invention, when a language (such as German) which the system does not have is required to be added, as long as install the German language package (de.apk), the PMS can identify the German language package from the language package set outside the system file, and add it to the resource candidate list. In this way, the present invention can add new system languages to the Android system fast and flexibly without using the brush machine method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A file processing method applied to an operating system, the file processing method comprising:
    packaging a first package file which supports a plurality of language versions into a plurality of first single-language package files, wherein the plurality of first single-language package files correspond to the plurality of language versions, respectively;
    wherein names of the plurality of first single-language package files are strings corresponding to a name of the first package file and language codes related to the plurality of language versions;
    adding the plurality of first single-language package files to a plurality of language packages, respectively;
    when changing a language version of the application to a specific language, searching a system language package corresponding to the specific language in a system file hi a framework layer;
    when it is unable to find the system language package corresponding the specific language in the system file in the framework layer, searching the language package corresponding to the specific language in the plurality of language packages;
    and loading the language package corresponding to the specific language.

2. The file processing method of claim 1, further comprising:
    packaging a second package file which supports the plurality of language versions into a plurality of second single-language package files, wherein the plurality of second single-language package files correspond to the plurality of language versions, respectively; and
    adding the plurality of second single-language package files to the plurality of language packages, respectively.

3. The file processing method of claim 2, wherein the first package file and the second package file are utilized for executing different applications.

4. The file processing method of claim 3, wherein names of the plurality of second single-language package files are a name of the second package file adding with language codes corresponding to the plurality of language versions.

5. The file processing method of claim 1, wherein the operating system is an Android system, and the first package file is an Android package file.

6. The file processing method of claim 1, wherein the step of loading the language package corresponding to the specific language comprises:
    loading the language package corresponding to the specific language to a candidate resource list.

7. The file processing method of claim 1, wherein the plurality of language packages are in a language package set.

8. An electronic apparatus using an operating system, the electronic apparatus comprising: a processor and a memory including computer program code executed by the processor;
    the code comprising:
    a compiling module, for packaging a first package the which supports a plurality of language versions into a plurality of first single-language package files, wherein the plurality of first single-language package files correspond to the plurality of language versions, respectively, wherein names of the plurality of first single-language package files are strings corresponding to a name of the first package file and language codes related to the plurality of language versions;
    a package management system, for adding the plurality of first single-language package files to a plurality of language packages, respectively; and
    a resource management system, when changing a language version of an application to a specific language, the resource management system searching a system language package corresponding to the specific language in a system file, and when unable to find the system language package corresponding the specific language in the system file, the packet management system searching the language package corresponding to the specific language in the plurality of language packages, and loading the language package corresponding to the specific language.

9. The electronic apparatus of claim 8, wherein the compiling module further packages a second package file which supports the plurality of language versions into a plurality of second single-language package files, wherein the plurality of second single-language package files correspond to the plurality of language versions, respectively; and the package management system further adds the plurality of second single-language package files to the plurality of language packages, respectively.

10. The electronic apparatus of claim 9, wherein the first package file and the second package file are utilized for executing different applications.

11. The electronic apparatus of claim 10, wherein names of the plurality of second single-language package files are a name of the second package file adding with language codes corresponding to the plurality of language versions.

12. The electronic apparatus of claim 8, wherein the operating system is an Android system, and the first package file is an Android package file.

13. The electronic apparatus of claim 8, wherein the resource management system loads the language package corresponding to the specific language to a candidate source list.

14. The electronic apparatus of claim 8, wherein the plurality of language packages are in a language package set.

* * * * *